US006942178B2

(12) United States Patent
Morgenstern et al.

(10) Patent No.: US 6,942,178 B2
(45) Date of Patent: Sep. 13, 2005

(54) MACH WEIGHTED AREA RULING FOR SUPERSONIC VEHICLES

(75) Inventors: John M. Morgenstern, Lancaster, CA (US); Alan E. Arslan, Santa Clarita, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 0 days.

(21) Appl. No.: 10/706,673

(22) Filed: Nov. 11, 2003

(65) Prior Publication Data

US 2005/0121555 A1 Jun. 9, 2005

(51) Int. Cl.[7] ................................................ B64C 1/38
(52) U.S. Cl. ..................................... 244/35 A; 244/119
(58) Field of Search ........................... 244/119, 117 R, 244/35 A, 35 R

(56) References Cited

OTHER PUBLICATIONS

Area Rule and Transonic Flight, http://www.aerospaceweb.org/question/aerodynamics/q0104.shtml.*
Sriram K. Rallabhandi and Dimitri N. Mavris, An Unstructured Wave Drag Code For Preliminary Design of Future Supersonic Aircraft, American Institue of Aeronautics and Astronautics Paper, pp. 1-8, Aerospace Systems Design Lab, Georgia Tech, Atlanta.
Minoru Yoshimoto, Naoki Uchiyama, Optimization of Canard Surface Positioning of Supersonic Business Jet for Low Boom and Low Drag Design, American Institue of Aeronautics and Astronautics, 2003, pp. 1-10, AIAA 2003-3576, 33rd AIAA Fluid Dyanics Conference and Exhibit, Orlando, Florida, Jun. 23-27, 2003.
Yoshikazu Makino, Ken'ichiro Suzuki, Masayoshi Noguchi and Kenji Yoshida, Non-Axisymmetrical Fuselage Shape Modification for Drag Reduction of a Low Sonic-Boom Airplane, American Institue of Aeronautics and Astronautics, 2003, pp. 1-11, AIAA 2003-557, 41st Aerospace Sciences Meeting and Exhibit Jan. 6-9, 2003, Reno, Nevada.
Donald C. Howe, Sonic Boom Reduction Through the Use of Non-Axsymmetric Configuration Shaping, American Institue of Aeronautics and Astronautics, 2003, pp. 1-9, AIAA 2003-929, 41st Aerospace Sciences Meeting and Exhibit, Jan. 6-9, 2003, Reno, Nevada.

(Continued)

*Primary Examiner*—Peter M. Poon
*Assistant Examiner*—Timothy D. Collins
(74) *Attorney, Agent, or Firm*—Koestner Bertani LLP; Mary Jo Bertani

(57) ABSTRACT

A method and design system for a low drag vehicle includes determining a plurality of configurations for at least two different Mach numbers that minimize the rate of change of cross-sectional area of the vehicle in accordance with the Sears-Haack minimum drag body. A user can specify design objectives and constraints to meet in determining optimum configurations for the vehicle, and the configurations are averaged to determine a final configuration. The at least two configurations can be weighted to emphasize optimum performance at particular operating conditions before averaging the configurations. The second order derivative of cross-sectional area for the final configuration can be smoothed, and then integrated twice to determine the cross-sectional area.

10 Claims, 5 Drawing Sheets

OTHER PUBLICATIONS

Charbel Farhat, Brian Argrow, Melike Nikbay and Kurt Maute, A Shape Optimization Methodology with F-Function Lobe Balancing for Mitigating the Sonic Boom, American Institute of Aeronautics and Astronautics, 2002, pp. 1-9, AIAA 2002-5551, 9th AIAA/ISSMO Symposium on Multidisciplinary Analysis and Optimization. Sep. 4-6, 2002. Atlanta Georgia.

Frank Marconi, Rodney D.W. Bowersox and Joseph A. Schetz, Sonic Boom Alleviation Using Keel Configurations, Journal of Aircraft, vol. 40, No. 2, Mar.-Apr. 2003, pp. 363-369.

Christine M. Darden, Sonic Boom Minimization with Nose-Bluntness Relaxation, NASA, 1979, pp. 1-50, NASA Technical Paper 1348, USA.

Richard L. Campbell, "Efficient Viscous Design of Realistic Aircraft Configurations", American Institute of Aeronautics and Astronautics Publication No. AIAA-98-2539.

* cited by examiner

MACH WEIGHTED AREA RULING FOR SUPERSONIC VEHICLES

BACKGROUND OF THE INVENTION

The area rule is an important concept related to the drag on an aircraft or other body in transonic and supersonic flight. The area rule was developed in the early 1950s when production fighter designs began pushing ever closer to the sound barrier. Designers had found that the drag on these aircraft increased substantially when the planes traveled near Mach 1, a phenomenon known as the transonic drag rise. The increase in drag is due to the formation of shock waves over portions of the vehicle, which typically begins around Mach 0.8. The drag increase reaches a maximum near Mach 1. Because the pressure drag increase results from the shock waves, this type of drag is referred to as wave drag.

Since the physics of supersonic flight were still largely a mystery to manufacturers, designers had no idea how to address this problem except to provide their aircraft with more powerful engines. Even though jet engine technology was rapidly advancing in those days, the first generation of jet-powered fighters was hampered by relatively low-thrust engines which limited them to subsonic flight. The US Air Force hoped to overcome this deficiency with its first dedicated supersonic fighter, the F-102 Delta Dagger.

Since the transonic drag rise was still not fully understood, the F-102's designers chose an engine they believed would provide enough thrust to reach a maximum speed of about Mach 1.2. However, initial flight tests of the YF-102 prototype indicated that the aircraft could not reach Mach 1. The aircraft's designers did not understand this lack of performance until a NACA researcher named Dr. Richard Whitcomb developed the area rule.

Whitcomb experimented with several different axisymmetric bodies and wing-body combinations in a transonic wind-tunnel. He discovered that the drag created on these shapes was directly related to the change in cross-sectional area of the vehicle from the nose to the tail. The shape itself was not as critical in the creation of drag, but the rate of change in that shape had the most significant effect. Stated differently, the wave drag is related to the second-derivative (or curvature) of the volume distribution of the vehicle.

To illustrate the point, Whitcomb's experimental models included (1) a simple cylindrical fuselage, (2) a cylindrical fuselage with wings attached, (3) a bulged fuselage, and (4) a "wasp-waisted" fuselage with wings. The addition of wings to the basic cylinder produced twice as much drag as the cylinder alone. Additionally, the drag rose by the same amount if a simple bulge was added to the cylinder, the bulge having equivalent volume to the wings. However, if the cross-sectional area of the fuselage was reduced over the region where the wings were attached, the total drag was about the same as that of the cylinder alone.

The conclusion of this research was that the drag on an aircraft could be drastically reduced by shaping the vehicle to create a smooth cross-sectional area distribution from the nose to the tail. The area rule dictates that the volume of the body should be reduced in the presence of a wing, tail surface, or other projection so that the discontinuities in the second derivatives of the total area distribution can be significantly reduced to match the distribution of a given minimum drag equivalent body.

Whitcomb's findings are related to a more theoretical concept called the Sears-Haack body. This shape yields the lowest possible wave drag for a given length, Mach number and volume. The variation in cross-sectional area for a Sears-Haack body results in minimized wave drag when the curvature of the volume distribution is minimized. The closer the volume distribution of an aircraft or other high-speed vehicle comes to the ideal Sears-Haack body, the lower its wave drag will be.

The area rule has found greater application to subsonic aircraft, particularly commercial airliners since they cruise at the lower end of the transonic regime. A good example is the Boeing 747, known for its distinctive "hump." This hump, which houses the cockpit and upper passenger deck, increases the cross-sectional area of the forward fuselage and has the effect of evening the volume distribution over the length of the aircraft. As a result, the 747 is able to cruise efficiently at a slightly higher speed than most other airliners since the increase in transonic wave drag is delayed. It is very difficult, however, to achieve realistic vehicle configurations that completely meet the ideal Sears-Haack body.

SUMMARY OF THE INVENTION

What is desired are new ways to achieve a vehicle configuration with minimum wave drag under a variety of flight conditions.

In accordance with some embodiments, a method for designing a low drag vehicle includes determining a plurality of aircraft configurations for at least two different Mach numbers that minimize the rate of change of cross-sectional area of the vehicle. The configurations are averaged to determine a final configuration. In some embodiments, a user can specify design Mach numbers with respective weights and constraints to be met in determining optimum configurations for the vehicle. The configurations can be weighted to emphasize optimum performance at particular operating conditions before averaging the configurations. The second derivative of cross-sectional area for the final configuration can be smoothed, and then integrated twice to determine the cross-sectional area.

According to other embodiments, a design system is provided that allows a user to specify design objectives and constraints; and determine vehicle configurations for at least two different operating conditions that minimize the drag of the vehicle within the specified design objectives and constraints. The configurations are weighted and averaged to determine a final configuration.

In some embodiments, a vehicle includes a main body portion, and lifting surfaces extending from the main body portion. The cross-sectional area of the fin is reduced in the vicinity of the juncture of the fin and the main body portion. The configuration of the vehicle is derived from the average of at least two configurations of the vehicle optimized for different Mach numbers.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

Figure 1A:
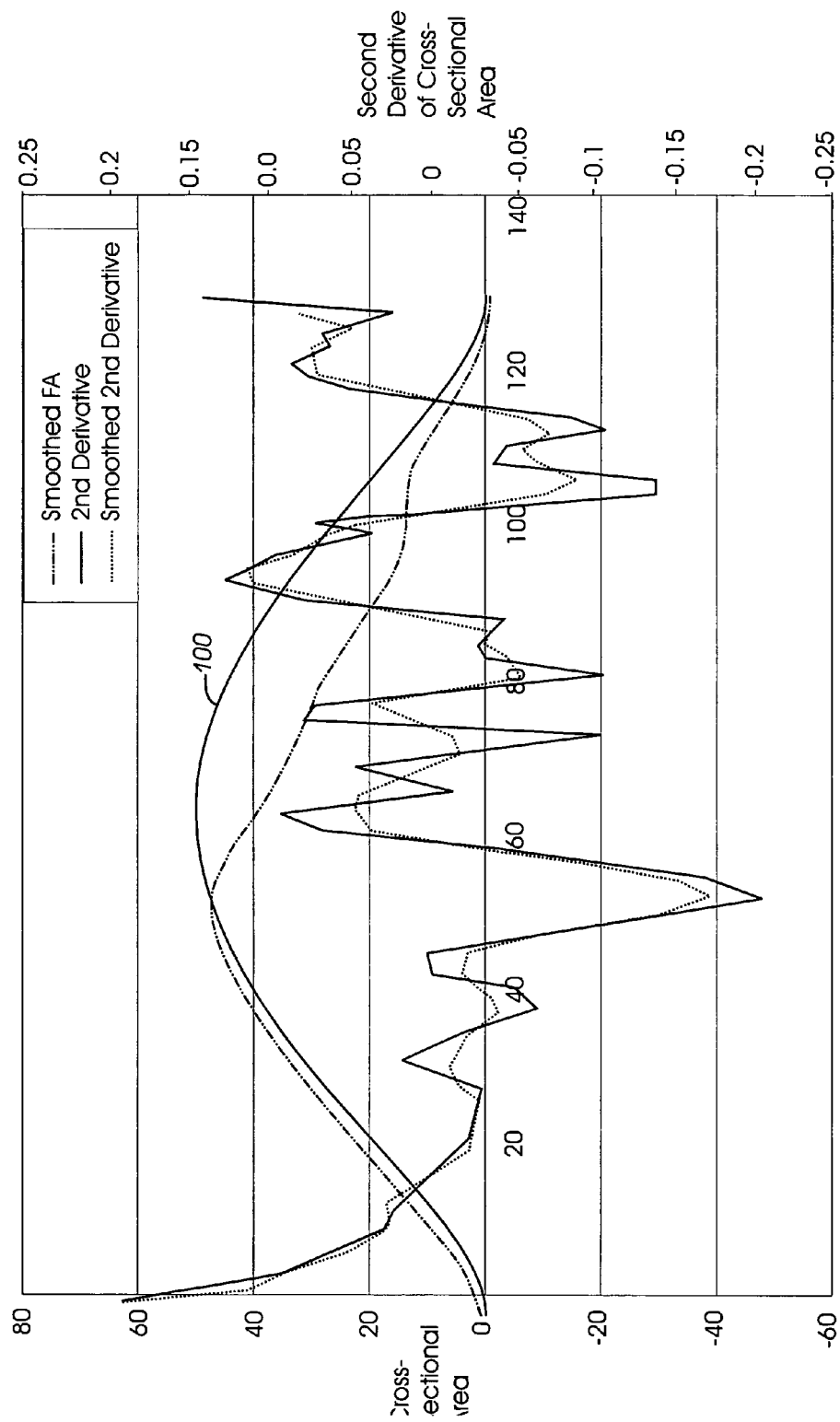
FIG. 1A is a graph showing the fuselage area after Mach weighting and smoothing, and the second derivatives of the fuselage area before and after Mach weighting and smoothing.
Figure 1B:
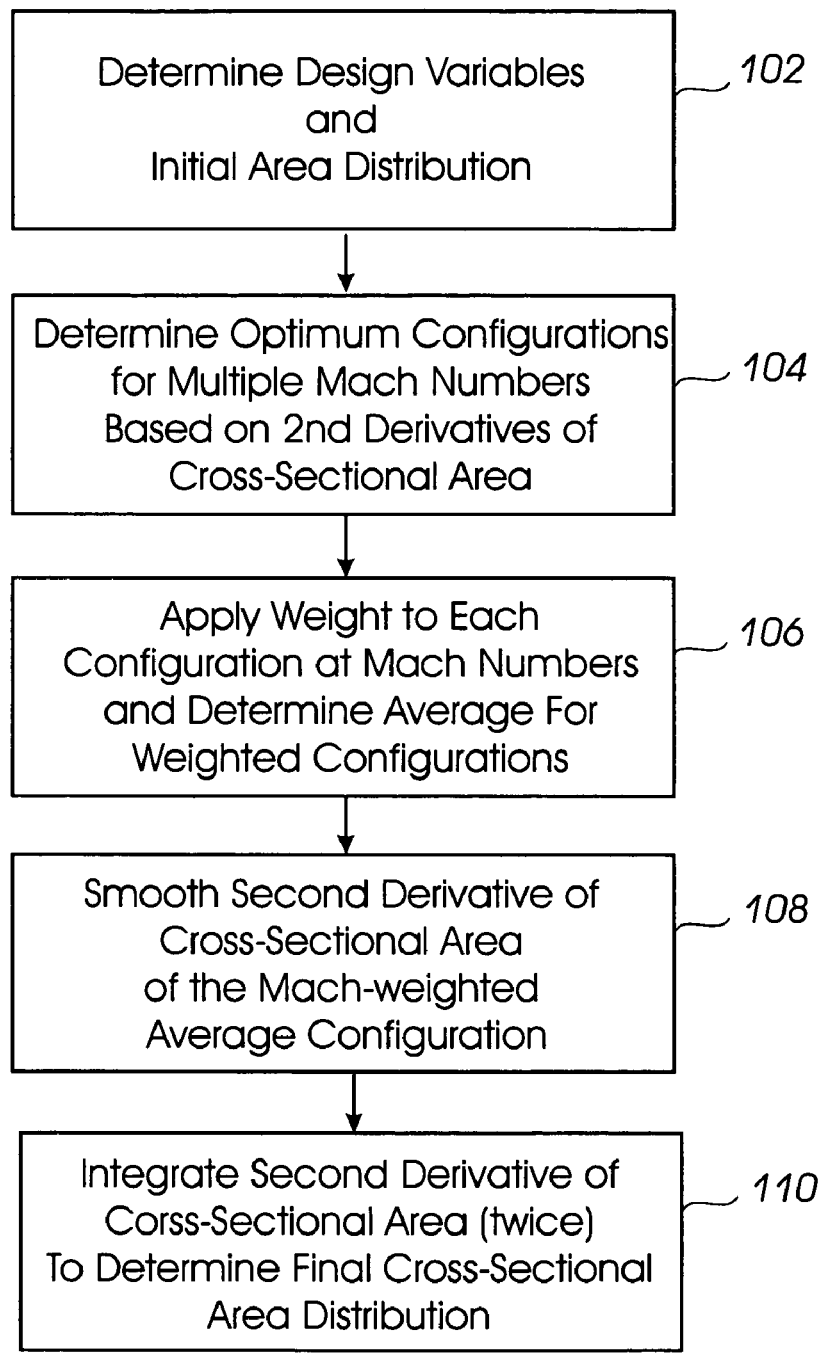
FIG. 1B is a flow diagram of an embodiment of a method for configuring the area ruled body shape for a supersonic aircraft.

Referring to FIGS. 1A and 1B, to minimize the wave drag due to change in cross-sectional area of a device such as an aircraft, the area of the device must follow a smooth bell curve shape known as a Sears-Haack curve 100 shown in FIG. 1A. The closer the cross-sectional area distribution of an aircraft is to the ideal Sears-Haack curve 100, the lower the wave drag. In some embodiments disclosed herein, optimization methods can be used to determine a cross-sectional area distribution that minimizes wave drag to the extent possible given other constraints, such as minimizing sonic boom disturbance caused by a supersonic aircraft. A single aircraft configuration typically will not be optimal for all flight conditions.

In some situations, a designer is able to segregate portions of an aircraft's flight regime into distinct phases during which the aircraft can be reconfigured to achieve optimum performance for a given flight segment. For example, while it is desirable to reduce sonic boom disturbances over land, louder sonic booms can be tolerated over an ocean or large unpopulated land mass. Sonic boom constraints are easier to meet at slower speed, such as 1.5 Mach, versus 1.8 Mach for supersonic cruise.

FIG. 1B is a flow diagram of an embodiment of a method for configuring the area rule shape for minimum drag for devices such as a supersonic aircraft. Process 102 includes determining design variables (DVs) to use to optimize a specified figure of merit such as wave drag at a given Mach number. Each design variable can be a single value, or a set of values for one or more parameters. For example, in some embodiments, variables defining the shape of the fuselage such as cabin height and diameter, cockpit visibility, cockpit size, and nose bluntness, can be used to minimize the drag due to the fuselage. In other embodiments, additional variables such as parameters that define the camber, sweep angle, incidence angle, twist, and aspect ratio of the wing can be used in addition to the fuselage variables to determine an optimum configuration given constraints such as low sonic boom, high lift to drag ratio, and center of pressure position that balances with the aircraft's center of gravity.

Accordingly, process 102 includes determining Mach numbers and design variables to meet specified objectives and constraints. For example, a first configuration can be specified that meets sonic boom constraints during climb and cruise flight over land; another configuration can be specified that optimizes range during cruise flight over unpopulated areas with relaxed sonic boom constraints; and other specified configurations that optimize specified parameters during a particular flight segment at different Mach numbers.

Since the optimum shape of the aircraft is typically slightly different for each Mach number, process 104 includes determining optimum configurations for multiple Mach numbers. In one embodiment, configurations are determined at Mach 1.0, 1.1, 1.2, 1.3, 1.4, 1.5, 1.6, 1.7, 1.75 and 1.8. Additionally, the design approach can be configured to optimize the first or second derivative of the cross-sectional area, which may converge more quickly to a solution than optimizing parameters representing the cross-sectional area alone. The wave drag of a vehicle is given by the following equation:

$$D_w = (-\rho U^2/4\pi) \int \int S''(x_1) S''(x) \ln|x_1 - x_2| dx_1 dx_2$$

Where $\rho$ is the free stream density; U is the free stream velocity; $S''(x_1)$ and $S''(x_2)$ are the second derivatives of the area distribution obtained from the roll-averaged projections of Mach angle cuts with respect to the integration parameters; and $x_1$–$x_2$, which are the locations along the longitudinal axis of the aircraft. The term roll-averaged projections of Mach angle cuts refers to cross-sectional area determined along Mach angle lines, and at several different roll angles for the configuration. Using the rate of change of the curvature (i.e., second derivative of the area distribution) allows minimized drag to be achieved more directly for a configuration compared to generating different cross-sectional areas, computing their second derivatives, and determining the configuration with the minimum rate of change.

Process 104 (FIG. 1A) can include adjusting various parameters associated with the design variables to determine optimum configurations for a device, for example, an aircraft based on goals and constraints, such as high lift to drag and minimized sonic boom disturbance at different Mach numbers. A single aircraft configuration typically will not be optimal for all flight conditions. The use of a variety of Mach numbers may also serve to smooth discrepancies between far-field linear theory and real fluid flow dynamics.

Process 104 can position the design variables along Mach angle lines, which vary according to the Mach number. Thus, optimum configurations for a device can vary between Mach numbers. In some embodiments, process 104 utilizes linear theory techniques to analyze shapes that meet constraints and are the closest to Sears-Haack equivalent body. Once a candidate configuration is identified, more complex non-linear computational fluid dynamic methods can be employed to further refine the configuration.

Process 106 includes weighting the second derivative of cross-sectional area for each configuration at a particular Mach number with a factor, summing the weighted values, and taking the average of the weighted values to determine the final configuration. The weighting factors can be equal or based on any suitable constraint(s) or criteria, such as percent of typical flight profile, minimum drag, minimum sonic boom, inlet flow distortion, and/or the difference between thrust available and thrust required (referred to as pinch-point). For example, configurations at Mach 1.5 and 1.8 can be weighted more than the other configurations to optimize performance for low sonic boom cruise Mach 1.5 and high-speed cruise Mach 1.8. Configurations at other suitable Mach numbers and combinations of weighting factors can be utilized. Additionally, while the weighting factors can be applied to the second derivative of the cross-sectional area, the weighting factors can alternatively be applied to the cross-sectional area, or the first derivative of the cross-sectional area.

Once the weighted average of the different Mach number configurations is determined, the weighted average configuration can be smoothed in process 108. For example, FIG. 1A shows graphs of smoothed and unsmoothed weighted average curves for the second derivative of cross-sectional area for an embodiment of an aircraft fuselage. The smoothed weighted average curve can be achieved using any suitable smoothing technique. For example, in some embodiments, the initial weighted average curve is filtered through the equivalent of a low-pass filter. In other embodiments, three-point smoothing is utilized, which includes taking the average of the values of points before and after a particular point, along with the value of the point itself. The smoothed weighted average curve shown in FIG. 1A is the result of applying three point averaging to the initial weighted curve.

When the first or second derivative of the cross-sectional area is used to optimize a configuration, process 110 includes integrating the derivatives to determine the cross-sectional area curves. FIG. 1A shows the weighted and un-weighted average cross-sectional area curves that result from the double integration of the weighted and unweighted average second derivatives of the cross-sectional areas, respectively.

Figure 2A:
FIGS. 2A through 2C are side, front, and top views, respectively, of an embodiment of a supersonic aircraft that can be designed utilizing the Mach weighted area ruling process of FIG. 1A.
Figure 2B:
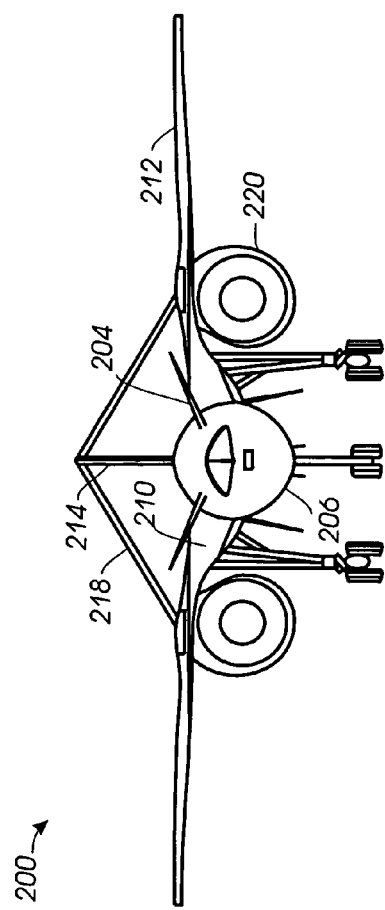
Figure 2C:
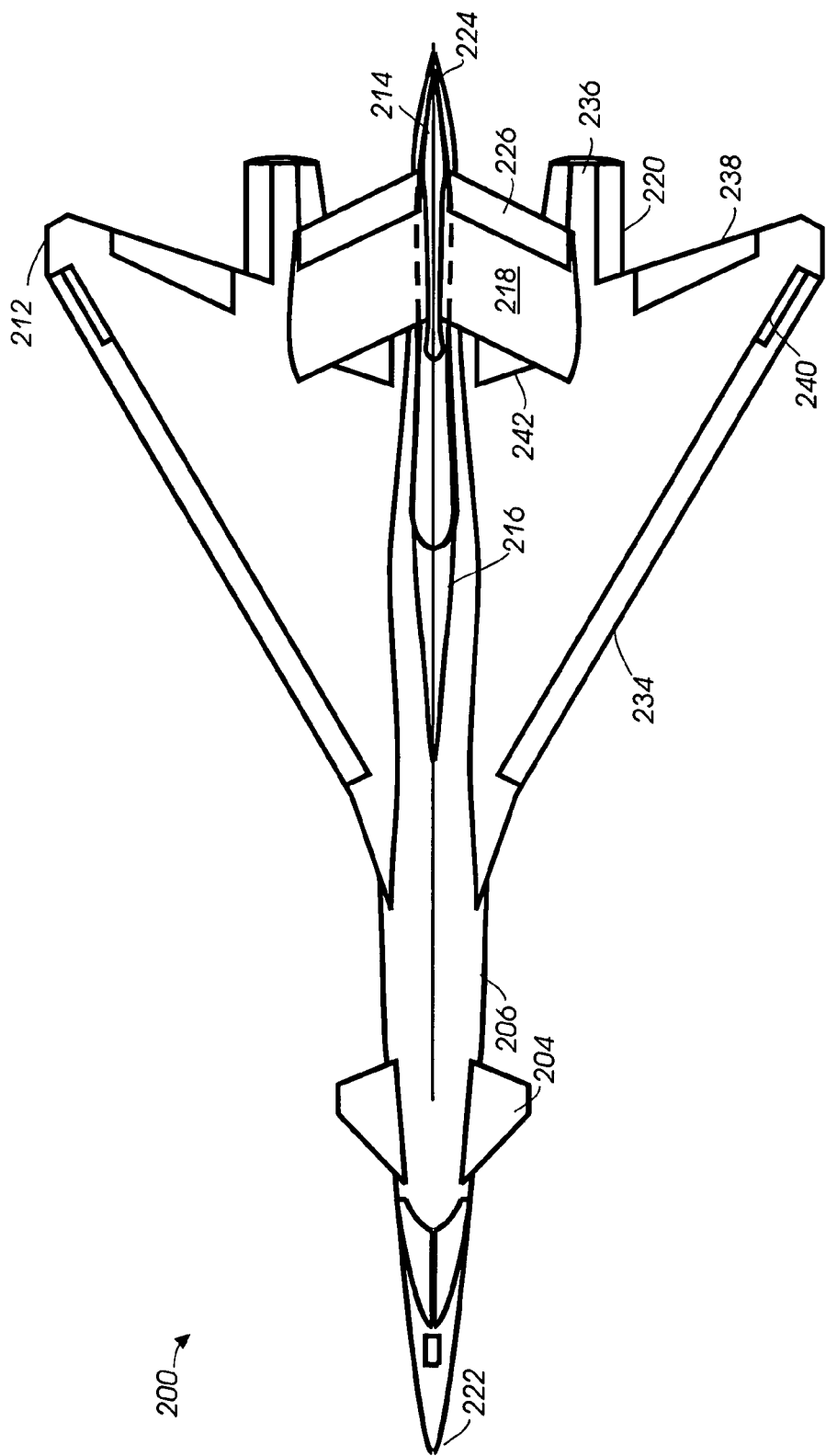

FIGS. 2A through 2C show side, front, and top views, respectively, of an example of supersonic aircraft 200 that can be designed using the Mach weighting, averaging, and smoothing techniques shown in FIG. 1B. In some embodiments, each configuration of aircraft 200 is overlaid with Mach angle lines 202, which vary for each Mach number. Design variables can be located at suitable locations, depending on the objectives and constraints being used to optimize the configuration and may include every point utilized in the discrete far-field wave drag integral along fuselage 206 at the desired level granularity.

To shape vertical fin 214, strake 216, and inverted V-tail 218 according to the area rule for minimum drag, parameters such as thickness, height, and width can be used to minimize cross-sectional area, as well as the second derivative of cross-sectional area. The design variables for determining an optimum area distribution typically include the area of fuselage 206, canard 204, wing 212, nacelles 220, and V-tail 218 along Mach angle lines 202. Fuselage 206, vertical fin 214, and strake 216 can be configured with areas of reduced cross-sectional areas, also referred to as "waisted" areas, in the vicinity of wings 212, nacelles 220, and V-tail 218 to help meet the ideal Sears-Haack curve 100 (FIG. 1A).

In some examples, aircraft 200 has twin non-afterburning turbofan engines (not shown) set below and behind wings 212. The non-afterburning turbofan engines operate behind fixed-geometry axisymmetric external compression inlets. Nacelles 220 enclose the engines and are coupled to the lower surface of wings 212.

Inverted V-tail 214 generates additional aft lift to improve aerodynamics and reduce sonic boom disturbances during cruise flight conditions, as well as providing structural support for wings 212 and engine nacelles 220. Supersonic aircraft 200 creates a shaped pressure wave caused by overpressure at nose 222 and underpressure at tail 224. Pressure rises rapidly at nose 222, declines to an underpressure condition at tail 224, and then returns to ambient pressure.

The shape of supersonic aircraft 200, including aspects of wing 212, V-tail 214, and a reflexed airfoil portion (not shown) integrated with engine nacelle 220, are adapted according to sonic boom signature and supersonic cruise drag considerations. In some embodiments, a portion of nose 222 can be blunted to create a pressure spike ahead of the aircraft forward shock, which raises local temperature and sound velocity, thereby extending the forward shock and slowing the pressure rise. Wings 212 can have a sharply swept delta configuration that reduces peak overpressure by spreading wing lift along the length of aircraft 200. Wings 212 can also include reduced leading and trailing edge sweeps. Inverted V-tail control surfaces, termed ruddervators 226, adjust aircraft longitudinal lift distribution throughout the flight envelope to maintain a low boom, low drag trim condition.

In some embodiments, the leading edges of wings 212 have a substantially straight geometry to accommodate Krueger flaps 234 that extend substantially the full length of wings 212. Wings 212 integrate with nacelles 220 and diverters 236, and follow the fuselage contour with a substantially normal intersection to reduce interference drag. An inboard wing flap hinge line is fully contained within the wing contour with upper and lower wing surfaces configured as planar as possible to facilitate aerodynamic performance.

Gull dihedral portions 210 raise the engines to increase available tip-back angle and reduce thrust-induced pitching moments. Gull dihedral portions 210 lower fuselage 206 to reduce the cabin door height above the ground and reduce entry stair length. Fuselage 206 sets a low aircraft center of gravity, reducing tip-over angle and promoting ground stability. Gull dihedral portions 210 form partial shrouds around nacelles 220, enhancing favorable interaction between nacelles 220 and wings 212. In addition, gull dihedral portions 210 enhance the aircraft low-boom signature by vertically staggering the longitudinal lift distribution of wings 212.

In some embodiments, supersonic aircraft 200 can include canards 204 on both sides of fuselage 206 that operate primarily as longitudinal power control devices, particularly during takeoff and high-speed flight. Canards 204 also fine tune the aircraft longitudinal trim condition and augment rudder operation by supplying yaw control power when canards 204 are deflected differentially.

Supersonic aircraft 200 can further include segmented ailerons 238 that supply roll control power and automatic wing camber control to improve lift and drag conditions through the flight envelope. High-speed spoilers 240 supplement aileron roll power at transonic and supersonic speeds where Mach number and aeroelastic effects reduce aileron effectiveness. Supersonic aircraft 200 has a high lift system including inboard trailing edge flaps 242 and full-wingspan leading edge Krueger flaps 234.

Canards 204 and symmetric deflections of the ruddervators 226 control pitch power. Rudder 250 controls yaw. Ailerons 238, and high speed spoilers 240 control roll at both subsonic and supersonic speeds. In an illustrative embodiment, trailing edge (TE) flaps 242 are deployed 20° down to generate additional lift during landing. TE flap deployment reduces angle-of-attack by approximately 2° during landing. During a subsequent segment of the climb, the TE flaps 242 can be extended up to 30° to improve the lift-to-drag ratio for better performance.

Leading edge (LE) Krueger flaps 234 can be extended up to 130° for low speed operations including takeoff, approach and landing. The LE Krueger flaps 234 can improve lift-to-drag ratio by a factor of 1.5, resulting in better climb performance that facilitates second-segment climb in case of engine malfunction.

Some of the control surfaces on supersonic aircraft 200 can perform multiple functions. For example, ruddervators 226 enable continued operation and landing following single actuator failure or jammed control surface. Differential deflection of canards 204 can generate a yawing moment to counter a jammed rudder 250. Ailerons 238 and ruddervators 226 include multiple surfaces, increasing fault tolerant capability and supplying redundant control elements for improved reliability.

Figure 3:
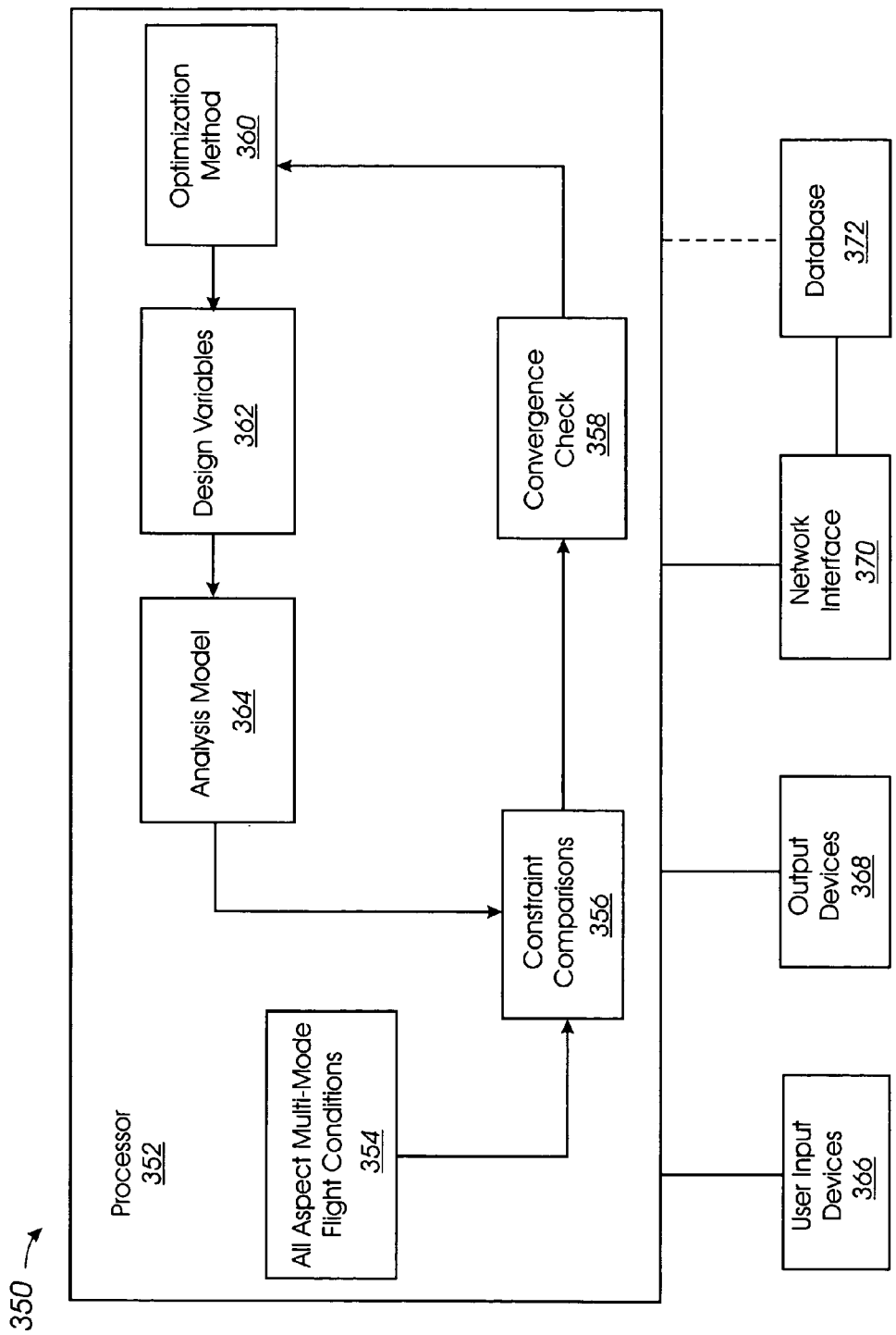
FIG. 3 is a block diagram of an embodiment of an aircraft design system that can be used to implement the Mach weighted area ruling process of FIG. 1A.

Referring now to FIGS. 1B, 2A, and 3, FIG. 3 is a block diagram of an embodiment of an aircraft design system 350 that includes logic instructions to implement at least some of functions of processes 102 through 110 in FIG. 1B. Logic instructions are executed in computer processor 352 for various functions such as Input All Aspect, Multi-Point Goals And Constraints instructions 354; Constraint Comparison instructions 356; Convergence Check instructions 358; Optimization Method 360; Set Design Variables instructions; and Analysis Model 364. Note that in other embodiments, additional sets of instructions can be performed by computer processor 352 in addition to, or instead of, instructions shown in FIG. 3.

Input All Aspect, Multi-Point Goals And Constraints instructions 354 receives input from users regarding the different flight modes at which the aircraft configuration will be optimized. For example, modes such low sonic boom mode at Mach 1.5, and high speed cruise mode at Mach 1.8 can be entered for analysis. The results of system 350 can include different settings for control surfaces and other reconfigurable aspects of the aircraft, as well as optimize the shape of fixed components such as wing camber; fuselage shape; wing, strake, and vertical fin shape; and engine nacelle position and shape, among others. In addition to various flight modes, the user may also enter different aspect angles at which to analyze and optimize the aircraft's configuration. For example, while a particular aircraft configuration may meet low sonic boom goals directly under the aircraft during flight, the sonic boom disturbance generated to the sides of the aircraft may be objectionable. Therefore, the user can enter different flight modes as well as the distance/angle from centerline at which the sonic boom disturbance will be analyzed to determine the aircraft's configuration during various flight modes.

Constraint Comparison instructions 356 receives input from all aspect, Multi-Point Goals And Constraints instructions 354 and Analysis Model 364. The geometry and performance of one or more configurations is compared to the constraints, such as lift to drag ratio, sonic boom, and geometry constraints. Convergence Check instructions 358 receive the constraint comparisons and determine whether a solution has converged to meet all of the desired constraints. If all the constraints have not been met, Optimization Method 360 is invoked.

Optimization Method 360 proceeds through iterative changes to the geometry and perturbations that, for example, optimize a defined cost function (e.g. drag) while satisfying geometric and aerodynamic constraints (e.g. fuel volume, cruise lift coefficient). Configurations can be optimized for single or multiple conditions. Target pressure distributions can be specified for inverse design, or as a constraint during optimization of other performance drivers. Any suitable optimization method can be utilized, including one or a combination of optimization methods.

Set Design Variables instructions 362 allow the user to specify locations on the aircraft's geometry, parameters at each location, and perturbation values for each parameter. The perturbations values can be single values, or a range of values, for each parameter.

Analysis Model 364 performs linear and/or computational fluid analysis (CFD) on candidate configurations and provides performance results to Constraint Comparison instructions 356. Any suitable analysis program or set of programs can be utilized for Analysis Model 364. The complete iterative design process for performance optimization, geometry shaping and CFD analysis may be automated. An example of a suitable linear theory software program than can be used for Analysis Model 364 is AWAVE, which was developed by Boeing Aircraft Company and NASA Langley. AWAVE determines fuselage cross sections which yield minimum wave drag by enforcing the supersonic area rule. Three-dimensional aircraft component definitions, such as wing, fuselage, nacelle and empennage are input into the program. Then, the far-field wave drag of the configuration is analyzed based on the equivalent bodies of those components, producing an optimum fuselage cross section distribution along its axis for design Mach numbers larger than 1.0. Once candidate configurations are identified, more complex non-linear computational fluid dynamic methods can be employed to further refine the configurations.

With respect to area ruling, an optimum shape at one Mach number generally will have more "waist" than shapes optimized for a higher Mach number. Analysis Model 364 includes weighting each configuration with a factor, summing the weighted values, and taking the average of the weighted values to configure aircraft 200 to operate efficiently over expected flight conditions, such as takeoff, climb, low boom climb and cruise, high speed cruise, and landing. The weighting factors can be based on any suitable constraint(s) or criteria, such as percent of typical flight profile, minimum drag, or minimum sonic boom, for example. In one embodiment, configurations are determined at Mach 1.2, 1.3, and 1.8. Configurations at other suitable Mach numbers and combination of weighting factors can be utilized.

The logic instructions can be implemented as software programs and distributed over an information network or suitable computer-readable media as a software application program that can be installed on a personal computer, a centralized server, or other suitable computer system. The logic instructions can also be implemented in hardware, firmware, and/or a combination of hardware, firmware and software. One or more user input devices 366 can be provided, such as a keyboard, mouse, light pen, or a component such as a disk drive that can read data input files from a disk, to enable a designer to enter suitable constraints and design parameters. One or more output devices 368 such as a display device, printer, plotter, or other suitable output device can be coupled to receive information from processor 352. A user interface can also be included that provides instructions for using system 350, possible design parameters that can be varied, as well as assistance in interpreting the results. The results can be formatted and output for use in other design systems, such as computer-aided design and drawing systems via network interface 370, to easily share the results of the design effort. Processor 352 can be configured to access a database 372 either directly or via network interface 370 for mass data storage and retrieval.

In addition to providing a system and method for configuring aircraft with an averaged, smoothed, Mach weighted area ruling to minimize drag, system 350 and processes 102 through 110 can be adapted to apply area ruling to the shape of any type of apparatus that includes surfaces subject to some sort of flow. For example, aquatic vehicles used on the surface and/or underneath water can be analyzed and configured to minimize cross-sectional area as well as change in cross sectional area to reduce wave drag.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed is:

1. A method for designating a low drag vehicle comprising:
   determining at least two vehicle configurations that minimize the second derivatives along cross-sectional area distributions of the vehicle configurations, wherein at least one of the vehicle configurations is determined at a Mach number and a roll angle that is different than the other of the at least two vehicle configurations;
   determining second derivative curves of the cross-sectional area distributions of the vehicle configurations;
   applying weighting factors to the second derivative curves to form weighted second derivative curves;
   determining the average of the weighted second derivative curves; and
   smoothing the average of the weighted second derivative curves to form a smoothed average second derivative curve.

2. The method according to claim 1 further comprising:
   optimizing the configuration for cross-sectional areas distributions obtained along Mach angle lines.

3. The method according to claim 1 further comprising: determines weighting factors for the at least two configurations based on the difference between thrust available and thrust required.

4. The method according to claim 1 further comprising: integrating the smoothed average second derivative curve to determine the cross-sectional area distribution for a final configuration.

5. The method according to claim 1 wherein smoothing the average of the weighted second derivative curves includes filtering the average of the weighted second derivative curves.

6. The method according to claim 1 further comprising:
   determining weighting factors for the Mach numbers based on a percentage of time the vehicle is expected to operate at each Mach number during typical operational profiles.

7. The method according to claim 1 further comprising:
   determining weighting factors for the Mach numbers based on at least one of the group of: minimized drag, minimized sonic boom disturbance, and minimized inlet flow distortion.

8. The method according to claim 1 wherein smoothing the average of the weighted second derivative curves includes averaging the values of selected points on the average of the weighted second derivative curves with points before and points after the selected points.

9. The method according to claim 1 wherein the vehicle is an aircraft.

10. The method according to claim 1 wherein the at least two vehicle configurations are structurally fixed.

* * * * *